United States Patent

Kefalas

[15] 3,655,441

[45] *Apr. 11, 1972

[54] ELECTROLESS PLATING OF FILAMENTARY MAGNETIC RECORDS

[72] Inventor: John H. Kefalas, North Billerica, Mass.

[73] Assignee: Honeywell Inc., Minneapolis, Minn.

[ * ] Notice: The portion of the term of this patent subsequent to July 20, 1988, has been disclaimed.

[22] Filed: Aug. 22, 1966

[21] Appl. No.: 574,147

[52] U.S. Cl. .......... 117/237, 117/34

[51] Int. Cl. .......... G11b 5/84, G11b 5/62

[58] Field of Search .......... 179/100.2 A, 100.2 C; 274/41.4, 43, 46, 46.3, 4; 252/62.5; 117/213, 93, 239, 47 H, 234, 237; 264/106; 340/174.1, 174 TF; 96/34, 63, 35

[56] References Cited

UNITED STATES PATENTS

| | | | |
|---|---|---|---|
| 3,113,297 | 12/1963 | Dietrich | 340/174 |
| 2,924,462 | 2/1960 | Dresser | 179/100.2 |
| 3,404,980 | 10/1968 | Gilman | 96/27 |
| 3,411,910 | 11/1968 | Crawford | 96/85 |
| 3,282,723 | 11/1966 | Melillo | 117/47 |
| 3,223,525 | 12/1965 | Jonker et al. | 96/35 |
| 3,205,121 | 9/1965 | Eichler | 161/231 |

*Primary Examiner*—Leonard Forman
*Assistant Examiner*—Dennis A. Dearing
*Attorney*—Henry L. Hanson and Fred Jacob

[57] ABSTRACT

A magnetic record having a non-magnetic substrate carrying information-storing tracks of magnetic material has a gelatinous material coating the substrate and particulate silver metal secured on the gelatinous material in accordance with the pattern of the recording tracks. The silver is provided in this pattern by coating the gelatinous material with a photographic emulsion that is subsequently exposed and developed according to the desired pattern of recording tracks.

14 Claims, 8 Drawing Figures

Figures 1, 2A, 2B, 2C, 3A:
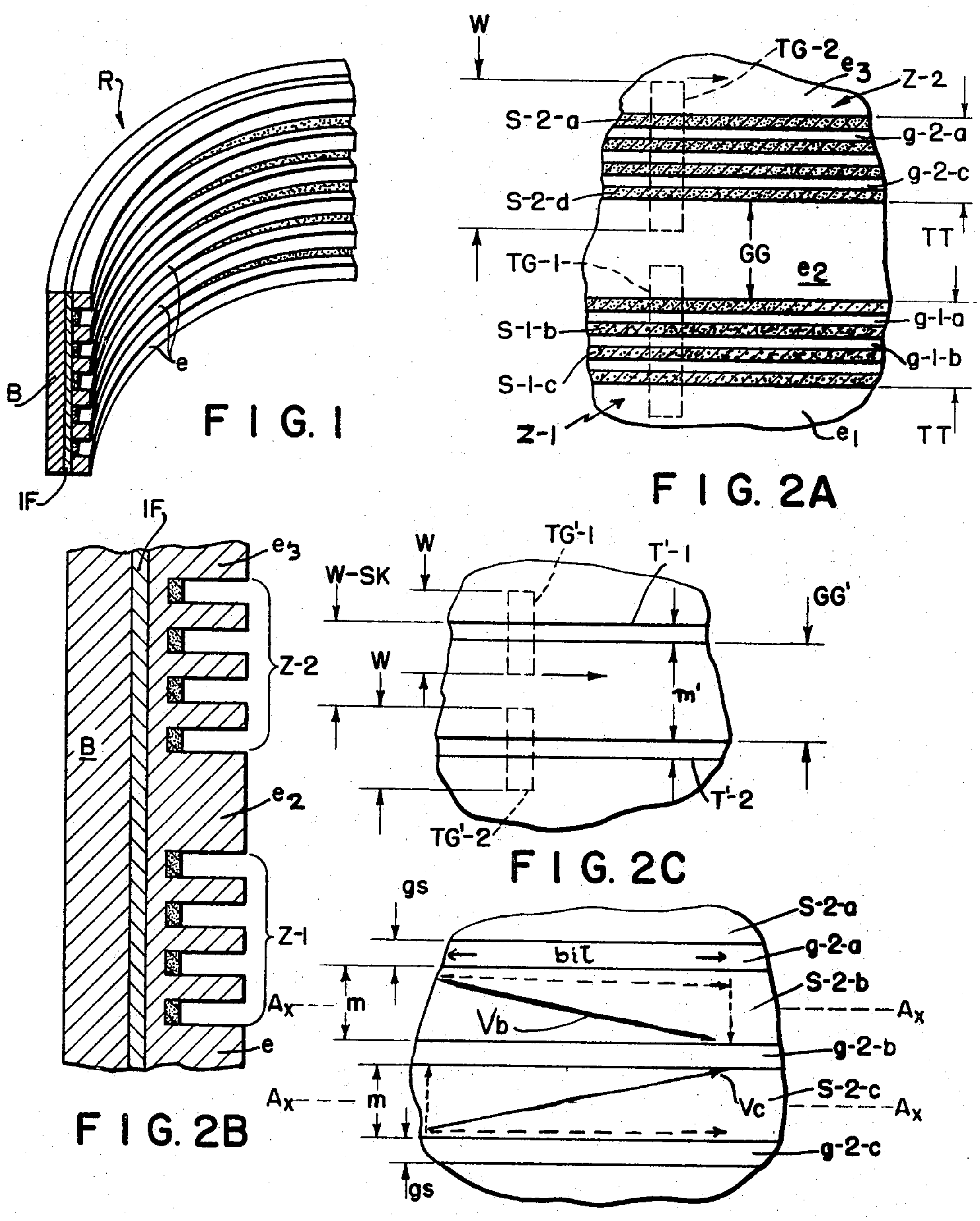

INVENTOR.
JOHN H. KEFALAS
BY
John J McCormack
ATTORNEY

INVENTOR.
JOHN H. KEFALAS
BY
John J. McCormack
ATTORNEY

ELECTROLESS PLATING OF FILAMENTARY MAGNETIC RECORDS

The present invention relates to discrete track magnetic records and methods for producing these; more particularly, it relates to such records having track width dimensions arranged to influence the magnetic properties of a discrete track record and the interaction of track impressions with adjacent magnetic fields. The invention, further, relates to such records including multi-filament tracks and to the fabrication thereof with coordinated photo-sensitizing and electroless plating of a gel-coated substrate.

A magnetic record medium may be characterized as a "discrete track" record when it provides a number of similar strips (tracks) of magnetic recording material extending parallel to a read/write axis, along which recording (and/or reading) transducers operate, each track being disposed in operative association with one such transducer. Such transducers may comprise conventional single gap ring heads. Such strips are separated by non-magnetic zones, the width thereof being conventionally dependent upon track-transducer positioning constraints. Discrete track records have been suggested as a means of increasing the "head re-positioning" tolerances in saturation digital recording. Hence, the width of recording tracks has typically been determined according to the desired track density and the maximum tolerable head re-positioning error. The present invention, by contrast, involves narrow filamentary record tracks wherein the discrete track strips are formed with a narrow, "anisotropic" width which is independent of transducer positioning constraints. For instance, when there is no head re-positioning error problems, workers in the art have heretofore preferred continuous, non-discrete magnetic recording surfaces; whereas such will never be desired according to the teachings of the invention. More particularly, the invention teaches a filamentary record configuration where strip, or filament, width is made a function of the recorded bit length chosen, to thereby provide a magnetic shape anisotropy along each track. The inner-track zones may be made wide enough to accommodate positioning errors or the like if desired, but otherwise are kept as small as possible, merely sufficient for an isolating reluctance rise therebetween. This anisotropy will advantageously induce a preferred ('-'EASY") direction of magnetization along the track length.

In any magnetic record, whether continuous or discrete track, a recorded magnetic bit (aligned bit domain) is degraded (e.g. "blurred") to a greater or less degree by adjacent magnetic fields. For instance, adjacent bit interference tends to de-magnetize at least a portion of a bit-domain, reducing the sharpness and strength of the readout signal therefrom. Such interference is greatly reduced by forming magnetic track strips according to the invention to have such a narrow, filamentary width as to minimize such de-magnetization within each bit-domain, making the strip width as small as possible (within the limits of acceptable readout voltage) approaching the width of single, unidirectional domain. For instance, according to the invention one may be given the storage requirements of a subject magnetic record (i.e. a minimum bit-density which, in turn, fixes the maximum bit-length acceptable — the coercivity being prescribed also) and thereupon may prescribe strip width (or "effective width", explained below) to be kept below a prescribed maximum and thus improve signal definition markedly. Conversely, by prescribing predetermined reduction in track width, the invention can facilitate a significant increase in bit density, consistent with retaining satisfactory readout nonetheless.

However, for some high density magnetic recording applications, especially where very little "adjacent bit interference" can be tolerated, the prescribed width of the recording strips will become so narrow as to reduce the readout voltage well below acceptable levels. For such applications, a modified "multi-filament" track configuration may be very advantageously provided according to another feature of the invention. As detailed below, such a configuration provides a plurality of minimum width parallel, spaced filaments across each nominal track zone. Such a multi-filament track provides an effective answer to the dilemma of how to minimize the amount of magnetic material across the width of a strip and yet retain sufficient (magnetized) material to maintain a satisfactory level of readout voltage.

It has also been found that the filamentary tracks of the invention greatly reduce skew (domain misalignment) and dispersion in a magnetic record. I have observed that a significant reduction in strip width yields a marked increase in bit-density with no significant aggravation of bit misalignment, other factors, such as "thickness demagnetization" etc. being kept within limits, of course. For example, with certain "hard" (high-coercivity) magnetic materials (e.g. about 250 Oe.), the mere division of a track strip 20 mils wide into two 10 mil strips with a miniscule gap therebetween, can make it practical to virtually double bit density (e.g. from 2,000 bits/in. to from 3,000 to 4,000). It has been found that for many "soft" (low coercivity, e.g. a few Oe.) materials, such strip width should be kept below about one-half the bit length (inverse of bit-density), while for many "hard" (e.g. a few hundred Oe.) materials, strip width may be considerably larger (e.g. an order of magnitude).

The multi-filament configuration also introduces large intra-filament demagnetizing fields which aid in opposing skew. As a result, workers in the art will appreciate that the bit density of an individual magnetic record can be greatly increased using such multi-filament tracks without sacrificing the quality of recording; conversely, readout signal strength may be greatly improved at higher bit densities. The intra-filament gaps, though tiny, also serve to reduce "residual noise" and "cross-talk". Further, by so minimizing adjacent bit interference and skew, the anisotropy width filaments of the invention allow the use of thicker (plated) strips giving stronger signal output, despite the increase in thickness-demagnetization therefrom. Such thickness-demagnetization has been of some concern in the art and limits the thickness of a magnetic film, specially for recording on "soft" materials, which are apt to be skewed badly thereby. Thus, the invention allows increasing strip thickness for stronger readout signals, especially for these "low $H_c$" materials.

Workers in the art will appreciate the tremendous advantages, magnetically, which derive from these teachings and which make discrete track records much more practical, such as by the use of the aforementioned multi-filament track arrangement. But, in addition, such a multi-filament construction provides advantageous mechanical features, such as for transducer/track engagement, whereby the introduction of intra-filament gaps across a recording track provides channels which may conduct an advantageous fluid flow, for instance for the often desired "air bearing" effect. It has been found that such channels may comprise grooved-out gap areas or, alternatively, depressed filament-areas disposed between upstanding non-magnetic "gap-lands". In either case, parallel air-channeling grooves are afforded along each filament length for supplying an air bearing film which helps support and lubricate the transducer passing thereabove. When the filamentary tracks are set in grooves between raised gap-lands, as aforementioned, it will be appreciated that the tracks are thus also mechanically protected from impact damage, e.g. from the transducer head.

When electroless plating metal films upon non-metal substrates, such as polymeric webs, it is conventional to first subject the substrate to an etching or related process for securing satisfactory adhesion properties. However, such etching is unavailable in the case of discrete plating, since the etchants remove the colloid coatings (e.g. photographic emulsion) characteristically used to define the plating pattern. Thus, there is a great need in the art for a means of electroless plating adherently without such etching treatments, especially in the plating of discrete patterns. The invention fills this need, teaching the use of a novel gel-coated substrate which eliminates the need for such etching. The invention also teaches associated electroless plating methods which allow the use of these photosensitive emulsions, and facilitate a practical discrete electroless plating, for the first time in the art! — especially for non-wetting plastic substrates. Thus, according to another feature of the invention, an improved electroless plating technique is taught whereby patterns, such as the aforementioned discrete track filaments, may be most effectively plated directly upon a non-metallic substrate, even one as difficult to plate as a smooth flexible polyester tape, such as a polyalkylene terephthalate (e.g. "Mylar" by DuPont). More particularly, a colloid-coated substrate is provided according to the invention to be very simply, and very precisely, photo-etched for thereafter electroless plating this discrete filament pattern by methods which yield very fine resolution and virtually limitless versatility in selection of plating patterns. According to a further feature of the invention, a magnetic record is provided having a plurality of superposed layers of like magnetic material separated by thick films of non-magnetic material of more than "magnetic coupling" thickness.

Accordingly, it is an object of the present invention to solve the above-mentioned problems and provide the aforementioned, and related, features and advantages. Another object is to provide a discrete track magnetic record wherein each track comprises a narrow recording filament having a prescribed "anisotropic" width such as minimizes lateral interference with magnetic data impressions thereon. Yet another object is to provide such a record wherein individual tracks each comprise a plurality of narrow filaments of minimum width, such filaments being separated by a virtually infinitesimal gap or like region of higher reluctance.

Still another object is to provide such a filamentary record wherein the surface levels of the filament material and of the non-magnetic lands therebetween are made to be different so as to provide air-channeling grooves along the track length for lubricating and protecting the record as it moves relative to associated transducers.

Still another object is to provide such a record having magnetizable filaments, of such a width dimension as provides a shape anisotropy characteristic to thereby improve magnetic characteristics, such as by reducing skew and dispersion. Still another object is to provide such a discrete track record by electroless plating upon a colloid-coated substrate having a photo-emulsion supercoating, the latter being selectively imaged, developed and etched, to provide a discrete plated record.

Another object of the invention is to provide an improved non-metallic colloid-coated substrate and associated processes for eliminating the usual etching/pre-conditioning steps and for facilitating the electroless plating of discrete patterns thereon. Still another object is to provide such a substrate and associated techniques for allowing electroless plating of shaped discrete metallic films using photo-imaging techniques. Still another object is to provide a multi-layer magnetic record having similar signal-reinforcing layers of magnetic material separated by non-magnetic material of more than "coupling-thickness".

Figures 3B, 4, 5:
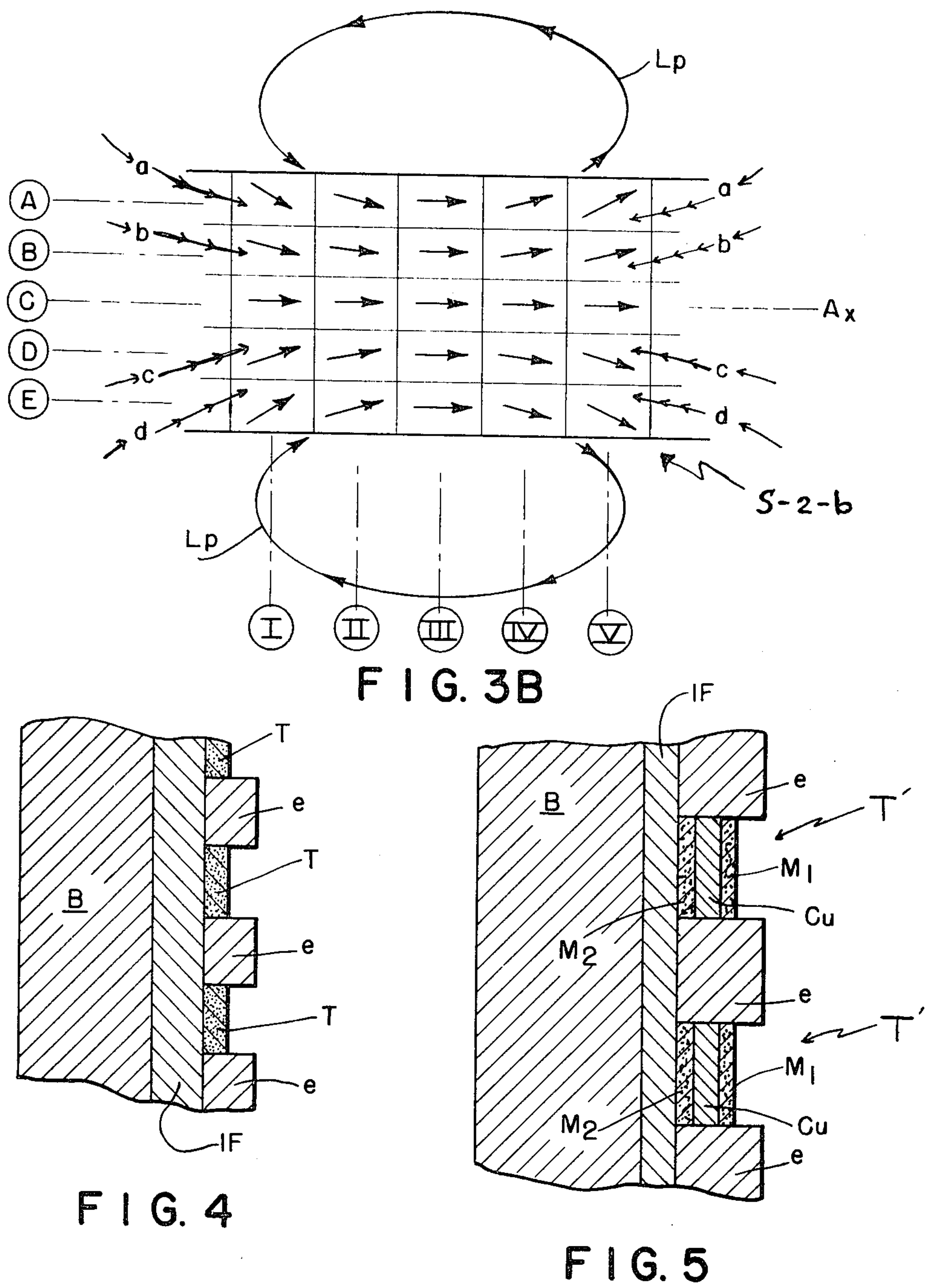

Further objects and features of advantage of the present invention may become apparent upon consideration of the following detailed description of certain embodiments thereof, especially when taken in conjunction with the accompanying drawings, wherein like reference numerals denote like parts, namely:

FIG. 1, a simplified perspective view of a magnetic unit record provided with magnetic recording tracks according to a preferred embodiment of the invention;

FIG. 2A, a plan view, greatly enlarged, of a portion of a record such as that of FIG. 1, but somewhat modified therefrom, to illustrate an alternate preferred embodiment;

FIG. 2B, an idealized sectional view of the record portion shown in FIG. 2A, with the section being transverse to the plane of that Figure and transverse to the recording tracks shown therein;

FIG. 2C, a schematic plan representation showing a pair of recording tracks like those of FIG. 1, illustrating a modified embodiment;

FIG. 3A, an enlarged, schematic plan view of a portion of one of the tracks in FIG. 2A;

FIG. 3B, a greatly enlarged, idealized representation of one of the filaments in FIG. 3A, indicating in idealized vectorial fashion a possible arrangement of magnetization domains therein;

FIG. 4, a schematic cross-sectional view through a portion of the discrete track magnetic record in FIG. 1, with the section being oriented transverse to the recording tracks shown therein; and FIG. 5, a schematic cross-sectional view of a record embodiment like that in FIG. 1, modified somewhat, with the section oriented transverse to the recording tracks shown therein.

PLATING TECHNIQUES

The preferred embodiment, namely a discrete track magnetic unit record, will now be particularly described below with reference, first to preferred electroless plating methods therefor and then to the structure thereof as shown in FIGS. 1–5. A preferred non-metal substrate B (FIG. 1) is selected to comprise a polymeric film web, more particularly a tape comprising a linear saturated polyester film base coated with a water-permeable colloid upon which a thin magnetic layer may be electroless plated. It is preferred to use a poly(alkylene) terephthalate film base, especially polyethylene terephthalate available under the trade names, "Mylar" and "-Cronar" (both by DuPont). "Estar" or "T-16" (by Kodak) may also be used, each base web being coated with a gel or other water-permeable colloid according to its characteristics.

Such polymeric film bases are mechanically strong, waterproof and dimensionally stable as well as being, in many forms, quite translucent and thus optically useful. Many such polymeric films are non-wetting and, in such case, will derive special plating advantages from the aforementioned colloid coating. Related non-wetting polymeric films also deriving such advantages are cellulose acetate, polyvinyl chloride, polyvinyl acetate, polyvinylidene chloride, polyacrylonitrile, the copolymer of the monomeric compounds chiefly composed of the above-mentioned polymers, other polyesters like polyethylene terephthalate and modified derivatives thereof as well as a base matrix of cloth, paper or the like impregnated or coated with non-wetting resins like the above-mentioned.

The polymeric film base is to be coated, according to one feature of the invention, with a relatively hard, water-permeable colloid, particularly a gel or the like, before introduction into the electroless plating line. Such colloid coatings are especially advantageous upon the above-mentioned non-wetting films for good, adherent electroless plating thereof. For the electroless plating described, for instance, it was found quite satisfactory to use certain commercially available gel-coated "photographic" films, such as certain clear sub-coated "Cronar" base films by DuPont (e.g. C–41; COS–7, "Cronar" Ortho–S Litho. film), heretofore used only for photographic work. However, I have found, as detailed below, that certain characteristics of a gel-coated film render it more receptive to electroless plating according to the invention. One may employ a relatively thin film comprised of a polyester base web coated, on the "plating-side", with a gel, or a like hard water-permeable colloid. The gel must be sufficiently hard, etc. so as not to dissolve readily in the pre-plating and plating dips. Other such colloids will suggest themselves to those skilled in the art, including polyvinyl alcohol, vinyl chloride, vinyl acetate, cellulose-derived gels and the like. It is preferred, in the following examples to keep the coated thickness of the gel, or other water-permeable colloid, less than about 500 $\mu$-in. thickness and for related plating processes. Greater thicknesses have been observed to give unsatisfactory adhesion. One reason for this thickness limitation is believed to be the characteristic low tensile and shear strengths of such gels. Because of this, the gels provide good "interface-adherence" only when kept confined between the adhered sheets (i.e. the relatively strong polymeric web and the plated metal film) so as to have a very small thickness therebetween relative to their extended length dimensions.

As an important feature, therefore, the invention will be seen to be useful for electroless plating of thin metal films onto polymeric film material or other non-metallic substrates to which a colloid coating like the aforementioned is applied. For instance, applicant has had considerable success, as seen below, electroless plating thin magnetic coatings (e.g. cobalt-nickel) onto gel-coated polyethylene terephthalate films. As noted below, the typical electroless plating baths and the gel-coated substrate to be plated therein according to the invention will be harmonized, where necessary, so that neither interferes with the operating characteristics of the other. For instance, the composition, temperature, time of immersion, etc. in the various plating, pre-plating and post-plating baths should be specified to ensure that the gel will not be wholly dissipated thereby; or conversely, the gel should be specified to be relatively insoluble therein.

As another feature of the invention, and contrary to prior accepted practice, I have found that such gelled substrates require not etching before immersion in electroless plating baths. Such etching customarily involves contacting the deposition surface with a caustic agent, such as an alkali metal hydroxide solution, for the delustering, hydrolyzing, etc. thereof. Though one may, if desired, and in certain instances, use such etching pre-treatments with the gelled substrates of the invention, it is significant that they are never required. Yet, a surprisingly superior adherence, wear resistance, etc. are obtained in the metal coatings electroless plated thereon, superior even to prior art electroless-plated coatings which use these customary etching pre-treatments.

It will be evident to those skilled in the art that dispensing with these common etching steps is both novel and quite advantageous. A rather unobvious advantage, however, is that doing so allows one to employ photosensitive supercoatings on electroless plated substrates and thereby generate discrete magnetic coating patterns. That is, I have found, as another feature of the invention, that it is possible to supercoat such gel coatings with a relatively conventional photosensitive emulsion and develop patterns therein which establish discrete patterns of electroless plating.

A related feature of the invention relates to a novel method for electroless plating discrete magnetic films onto a gelled substrate coated with photographic emulsions, the latter including photosensitive silver compounds. More particularly, I have found it possible to control where such a film will be electroless plated according to where silver compounds are left on the gelled surface.

According to another feature of the invention, I have found that such gel-coated substrates can be so electroless plated to have considerably improved, unexpectedly high scratch resistance when the substrate film is pre-conditioned according to a prescribed etching treatment. By way of example, I will discuss my invention in light of a specific process for plating various coated substrates as indicated below. However, it will be understood that this description is not intended to limit the invention to the precise processes, conditions, ingredients or applications mentioned, but merely to indicate the best illustrative embodiments enabling those skilled in the art to practice the invention and to suggest suitable equivalents to the materials and techniques taught, the invention being defined within the scope of the appended claims.

EXAMPLE I

According to one feature of the invention a novel gel/photo-emulsion coated substrate is selected to electroless plate discrete (non-continuous) metal coating patterns, using convenient, advantageous photographic techniques for generating the patterns. It is new in the art to be able to electroless plate discrete non-continuous films in a practical sense. As aforementioned, this is primarily because the customary pre-etching makes photo-resist masking means useless, removing it indiscriminately. Conventional electroless plating therefore is required to be continuous.

In this example, a thin magnetic film is electroless plated onto a gel-coated polyethylene terephthalate web, known by the trade designation: "Clear Sub-coated Cronar "COS-7" film (by DuPont). This substrate comprises a clear film web (tape) about 7 mils thick, coated on one side with a layer of clear gelatine, the gelatine then being supercoated with a layer of photographic emulsion, these two layers aggregating about 200 microinches in thickness. Such a film has conventionally been employed merely for photographic purposes. A like gel, or other water-permeable colloid, may be used, of the type compatible with electroless plating treatments, containing no metals, salts, etc. or the like which affect them adversely. The coated film is introduced continuously through an electroless plating line as follows, first being photo-imaged to generate a prescribed selectable plating pattern, e.g. of the aforementioned discrete magnetic filaments:

Step 1 – Negative Imaging

A negative light image of the pattern is projected onto the photo-emulsion supercoating so as to conventionally sensitize it and to induce a latent image thereon, sensitizing the intended "void" (or non-plating) areas, the plating areas being left unexposed and unsensitized. One may conveniently effect this by providing a pattern-conforming "positive-mask" over the film and then exposing the void areas to spectral radiation sufficient for thereafter developing the film.

Step 2 – Development

The imaged film is then immersed in a developing solution, namely DuPont "No. 53-D, All Purpose Developer", or the like, which, as conventionally used, will "develop" the photo-emulsion and also "fix" it, i.e. will reduce the sensitized silver halide compounds to free metallic silver (in the void areas) and also remove the unsensitized silver compound particles (in the plating areas). Such a developer may act to wash away most of the emulsion in the plating areas where no metallic silver is present. This leaves the plating areas somewhat white looking and the void areas somewhat darkened (more opaque), the free silver particles having been made visible there.

Step 3 – Sensitizing

The tape is conventionally unspooled from a supply reel by a take-up roll and continuously drawn through a number of plating treatment stations at about 10 inches per minute (for about 1 micron plated thickness). Initially, the tape is introduced into an acidic, stannous sensitizing bath with pH about 0.2 known as "Enplate Sensitizer No. 430" (prepared by Enthone Co. -- diluted 1:15 water). An equivalent sensitizer would include halide salts of tin and might also include a wetting agent, if desired. A titanous sensitizer may also be substituted. After about 1 minute immersion in the "Enplate" sensitizer at room temperature, the tape is run through two clean water rinses, flushing away all sensitizing residue to prevent it from contaminating following baths. As a means of adjusting the sensitizer immersion-time, the bottom rollers in the sensitizer tank are made vertically adjustable (in height) to thereby change the distance through the solution traversed by the tape, assuming a constant transport rate. Such an immersion-time adjustment may also be provided in subsequent dips. It has been noticed that the time/temperature of immersion for such film is somewhat critical and should not be greatly exceeded.

Step 4 —

The tape is next drawn continuously through an activating (or "seeding") solution of the type known as "Enplate Activator No. 440" (prepared by Enthone Co. — diluted 1:15 water); being immersed therein for about 30 seconds at room temperature. Substitute activators may comprise halide salts of silver or palladium, such as an acidic solution of palladium chloride.

The aforementioned sensitizing and activation steps are of a type known in the art and may be modified or substituted for as recognized by those skilled in the art. For instance, the sensitization step typically functions to sensitize the tape surface for subsequent adsorption of catalytic nuclei, the stannous ions ($Sn^{++}$) being adsorbed well into the gel. This adsorption may be intensified by addition of a small amount of stannic ions ($Sn^{++++}$). Following this sensitization and prior to the seeding (activation) dip, one may interject a "silver activation" dip in an aqueous solution of silver nitrate or the like so as to produce a strongly adherent deposit of isolated particles of silver, reduced by the adsorbed stannous ions. When this step is followed by immersion of the substrate in an acidic solution of palladium chloride, the silver particles are replaced by palladium particles which form the catalytic growth nuclei aforementioned. Furthermore, the sensitization and activation steps may be replaced by a single combined "sensitizing/seeding" immersion of the substrate in a catalytic metal sol known in the art, being referred to, for instance, in U.S. Pat. No. 3,011,920. Such catalytic metal sols include both the sensitizing (stannous) material and the seeding (palladium) material, characteristically suspended, as a colloidal dispersion, out of reacting contact by an emulsifying agent to prevent their precipitating out of the sol. Droplets of this suspension will be adherently deposited upon the substrate. Immersion in this sol is characteristically followed by a "de-emulsifying", or accelerator, dip which acts to quickly release the sensitizing and seeding materials to react and effect the formation of the aforementioned growth nuclei so that electroless plating may occur thereon.

In the above-indicated pre-plating steps the various times of immersion are adjustable, although each will be long enough to insure complete treatment of the tape surface as understood by those skilled in the art. It will be appreciated that the consistency of the solutions, their concentration, temperature and the like, as well as the particular identity of the substrate are somewhat variable within the skill of the art and that these parameters are interrelated as influencing the required time of immersion.

The seeding immersion is followed by two clean water rinses using cool, continuously running water, preferably distilled. This is followed by a third rinse wherein the water is sprayed against the tape to prevent the introduction of activator material into the following plating solution and decomposing it. Spraying helps to dissipate bubbles of activator solution which are not rinsed away. This rinse also eliminates staining of the tape.

Step 5 – Plating

The electroless plating is next performed by introduction of the tape immersingly through a set of tanks containing the plating electrolyte. The following aqueous electrolyte was used to plate a nickel-cobalt-phosphorous magnetic film about one micron (0.040 mils) thick in tracks on the gelled tape. This magnetic thin film deposition is effected, as known in the art, by the autocatalytic reduction of nickel and cobalt source ions, with hypophosphite ions serving both as a reducing agent and a source of phosphorous for the magnetic film alloy. Equivalent plating baths will readily occur to those skilled in the art. The ingredients are as follows (in grams per liter of aqueous solution).

| ELECTROLYTE | |
|---|---|
| 50 $CoCl_2 \cdot 6H_2O$ | |
| 30 $NiCl_2 \cdot 6H_2O$ | |
| 40 $NaH_2PO_2$ | |
| 50 Rochelle Salt | |
| 25 $NH_4Cl$ | |
| 40 Citric Acid | |
| Bath Temperature range: | 60° – 95°C. Prefer 70–90°C. |
| Bath pH: | 7.2 – 10.0 |
| Immersion Time: | To yield prescribed thickness (1 micron) |

Operating at a temperature of about 80° C., this preferred plating solution yielded a highly adherent, satisfactory plate about 1 micron thick in about 4 to 6 minutes plating time. As with the prior immersion, it is preferred that roller means be placed within the plating tanks to guide the substrate tape therethrough, these rollers being changed periodically to prevent undue build-up of plated material and consequent peeling, decomposition of the bath, etc. The bath is heated and is recirculated to the plating tank past filtration means. Various other thin metal films may also be electroless plated in this manner, the superior adherence, etc. being especially advantageous for magnetizable metals, such as cobalt, nickel and alloys thereof, including iron, phosphorous, and the like.

Step 7 – Finishing, Testing

The plated tape is then tested and subsequently drawn through a clean water rinse and then through a drying station (drip tank) for about 3 minutes) to dry it sufficiently for storage on a take-up roll.

The results of the above-mentioned plating of the gel-coated tape are unexpected and may be characterized as uniformly "excellent", compared with the prior art. This plated tape is found to be unusually corrosion free, not corroding after being immersed in water for as much as 48 hours; whereas analogous prior art tapes either completely dissolve or at least lose all adhesion after a soak of only about 12 hours. The magnetic properties of the plated film are excellent and adhesion to the substrate is outstanding, as is wear resistance. Adhesion is superior to any known prior art plated tape, such as plain uncoated polyethylene terephthalate tapes, even when these have been pre-roughened by etching treatments or the like. For example, the tape plated according to this example will readily pass the "Cellophane Tape" adhesion test, where comparable prior art plating will not. Moreover, it shows no appreciable wear after many hundreds of thousands of passes against a magnetic read-head. For instance, with high bit density magnetic recording, a uniform readout can be maintained with less than 3 percent reduction of the signal after hundreds of thousands of passes against a typical magnetic read-head. Further the tape exhibits a very high, shiny smoothness. The plating coverage is quite satisfactory, being continuous (over each track) and uniform, with no stains and none of the many dropouts (plating voids) that have plagued prior art systems.

The above electroless plating will be observed to form a discrete metal pattern, plating occurring only upon the unexposed, or non-imaged, areas, no plating occurring in the exposed, void areas. It is believed the presence of the free silver particles in the void area prevents the sensitizer (step 3) from adhering there adequately, thus preventing the following deposition of the activator (palladium nuclei) material on which, alone, electroless plating will take place. In this manner, a discrete pattern is plated which nicely adheres to the gel in the unexposed areas (i.e. where the remaining unexposed silver was "washed" away); and leaves the exposed silver-containing areas (or voids) unplated.

It should be noted that in this electroless plating process, there is no etching or the like prior to the plating dip. Etching should be avoided, since typical etchants will destroy the discrete plating pattern. For instance, the caustic etchants customarily used for prior art electroless plating will indiscriminately attack and remove all the photo-emulsion so that a continuous gel-coating would be left and continuous plating would thus occur. Thus, it is an important feature of the invention that discrete electroless plated patterns may be produced upon non-metallic substrates, and without the use of photo-resist treatments — something not feasible heretofore. Moreover, it is an important feature of the invention that such discrete electroless plating is facilitated by provision of a novel gel/photo-emulsion coated film substrate and an associated novel electroless plating method. It will be recognized that here, even more than with continuous plating, it is significant that the invention eliminates the need for preliminary etching steps heretofore common in the art.

Alternatively, in this example, one may substitute a DuPont "No. COS–4" substrate film like the aforementioned "COS–7", except that the film base is 4 mils thick; or a Kodak "COA–4" or "EO–4" film substrate (4 mil "Estar" base with composite gel/emulsion thickness of 200 $\mu$-in), or a like gel/photo-emulsion coated film may be substituted.

EXAMPLE II

According to another feature of the invention, and using the composite film substrate like that of Example I, a similar discrete photo-imaged plating pattern is conveniently electroless plated according to a somewhat modified process, as follows. Here, however, the imaging is reversed, to expose and develop the plating areas (masking over the void areas) and, after etching away the emulsion layer there, to plate upon the underlying gel.

Step P–1 – Positive Imaging

A positive light image of the pattern is directed against the photographic emulsion on a composite "COS–7" film substrate described above, or its equivalent, so as to photosensitize the silver (halide) compounds in the plating areas, but not in the void (non-plating) areas. This sensitizing is a reversal of that in Example I. Conversely to Example I, a "negative mask" may be used and sufficient light exposure provided to render these plating areas developable and etchable, as described below.

Step P–2 – Development

The film is next drawn through a special developer solution, such as DuPont "21–D" powder developer, DuPont "-Cronalith Code CLLD Litho-Developer" (liquid), or the like. Such developers, unlike that used in step 2 (Example I), perform no fixing action, but leave the unsensitized emulsion (in the void areas) unaffected, and merely developing (reducing) the sensitized silver compounds in the plating areas, darkening the latter.

Step P–3 – Bleaching

The film is then rinsed and drawn through a prescribed "-bleaching" solution, such as DuPont "3–ES Bleach", or the like, for about 1 minute at room temperature. This bleach removes all the developed emulsion (in plating areas only), leaving the gel exposed there, but substantially unaffected. This bleach leaves the unsensitized, undeveloped (void) areas of the emulsion unaffected.

Step P–4 – Develop Negative Areas

The film is next non-selectively exposed to photosensitize the "void" emulsion areas. Then, the film is drawn through an "All Purpose" type developer, such as DuPont "53–D" to develop and thus stabilize these void areas, the metallic silver particles thereby produced visibly darkening the emulsion there. This step may be omitted in cases where the gradual darkening of void areas (upon continued exposure to light) is not objectionable.

Step P–5 – Plating

The film is then introduced through the "non-etching" electroless plating line described in Example I, steps 3 – 7. As before, etchants will likely interfere with discrete plating since they would typically remove the emulsion on the void areas, resulting in a mere continuous plating of the entire surface.

The above steps will have left "plate-able" gel areas and "non-plateable", upstanding void, or developed-emulsion, areas. A discrete pattern of metal may thus be electroless plated in the depressions left in the emulsion supercoat. This plated pattern has been formed using a positive photo-imaging technique (light-pattern conforms to, sensitizes "positive", i.e. plating, areas) as opposed to the negative photo-imaging technique in Example I. Example II also yields a "sunken" plating pattern, with photo-emulsion "lands" in the void areas, as opposed to the raised plated "lands" of Example I. However, these photo-emulsion "lands" may be removed as described in Example III below.

Such discrete plating patterns are highly advantageous. For instance, they may comprise discrete tracks of thin magnetic films on a magnetic record substrate for "discrete track recording" (FIGS. 1–5). Of course, the magnetic material may be plated in the grooves according to one form of the invention, and such depressed (in-groove) magnetic tracks (FIGS. 4, 5) will be recognized by those skilled in the art as very useful both for improving magnetic properties of the record and for improving performance of associated transducers. For instance, the photo-emulsion between adjacent tracks magnetically isolates adjacent magnetic "bits", reducing "cross-talk", adjacent bit interference and the like. The grooves can provide a valuable "air bearing" effect, built right into the plated record itself. That is, the grooves can be formed to control the aerodynamics of the air flow over each track as the record is moved so as to produce an air bearing effect, i.e. a cushioning type of air flow, suspending the magnetic head "flying" thereabove. Such grooves may also protect the plated track from damaging contact with the magnetic head. Thus, the cross-sectional volume defined by the track depression may be prescribed to provide a desired aerodynamic lift for a particular recording/readout system (head shape, weight and speed, etc.). Though such an "air bearing" effect has been used before, no such arrangement for "channeling" the flow along the magnetic tracks themselves has heretofore been proposed. The precise dimensional control possible with the invention is especially advantageous in such cases.

A related application is the plating of discrete magnetic "sub-tracks" (FIGS. 2, 3) where each magnetic track zone comprises a number of thin, closely spaced, parallel filamentary strips, i.e. very narrow "sub-tracks". Therefore, instead of plating each single magnetic "track" to be continuous across its width, a plurality of spaced filaments are plated across this width, each being separated by a prescribed minimal gap. It will be appreciated that use of the above discrete pattern, electroless plating techniques may readily provide such a "-multi-filament-track" magnetic record. It will be recognized by those in the art that very desirable advantages can be derived with such "multi-filament" tracks since, unlike single continuous tracks, they can provide "shape anisotropy" and also reduce skew and dispersion of magnetization. The result is improved signal output and higher bit densities, as is discussed below.

An application related to this discrete track magnetic record is the shaping of flat thin films for magnetic memory applications, such as "read only memory" matrices and the like. In this application one or more metal "spots", preferably having a generally elliptical shape, are electroless plated onto the film substrate. As those skilled in the art will appreciate, this highly desirable elliptical shape exhibits a minimum of (edge) demagnetization effects; however, it has been heretofore difficult to form accurately. The spots may be deposited as were the discrete tracks, the imaging pattern being easily adapted to produce these elliptical shapes, or any others.

EXAMPLE III

Using the substrate of Example II, the process there is repeated, being slightly modified by an additional post-plating step to produce only discrete upstanding plated "lands", the emulsion in the void areas therebetween being removed as follows.

Step P′–6 – Remove "Void Coatings":

It is assumed that the film substrate has been exposed and developed such as indicated in step P–4 above to thereby photosensitize the emulsion in the void areas and develop it. It is also assumed that the discrete electroless plating in step P–5 has been performed. This done, the plated film is then immersed in a bleaching solution, such as one of those described in step P–3 above (Example II). This will remove the "void emulsion", leaving the gel therebeneath exposed between the plated "lands". The "void" gel, may also be removed where desired, e.g. to provide higher plated "lands". The resultant "-clad-like" plating areas, with unplated depressions therebetween, is novel in the art and those skilled in the art will recognize many valuable applications therefor.

Step P″–6 (Alternate)

Alternative to the treatment in step P′–6 above, optional step P–4 may be omitted leaving the "void-emulsion" substantially undeveloped. In this case, this "void-emulsion" may be later removed after the plating of step P–5 by etching it away. A relatively strong etchant, such as KOH, may be employed so as to also remove the gel under this "void-emulsion".

Other significant advantages of such discrete magnetic plating will be evident to those skilled in the art. For instance, it will be apparent that discrete plating increases the life of plating solutions and increases their plating efficiency. The discrete electroless plating of the invention has many advantages over competing methods for forming discrete patterns of metal on a substrate, such as by depositing a continuous metal coating and then selectively etching away the unwanted portions. Such an etch can damage a substrate and the magnetic coating thereon; moreover, it provides relatively poor pattern resolution (line definition). Discrete electroless plating is thus safer and more accurate and is obviously more convenient and efficient. Further, with discrete magnetic films, it provides such superior resolution as to enable one to form narrow magnetic recording tracks on the order of 5 mils wide, thus greatly increasing bit density, etc. The invention also avoids the usual deleterious effects from etching plated magnetic material and resolution is superior, without the "ragged-edges" of prior art methods. For instance, resolution on the order of about 0.1 mil is possible. This, of course, contributes greatly to uniformity and control of magnetic properties and to a minimum of demagnetizing effects.

The invention is also superior to competing prior art discrete deposition methods, such as vacuum deposition using masks. Masking also is cheaper, more convenient and more accurate using the invention, as are the deposition methods; further, the latter are better adapted for "on-line" fabrication.

Other similar applications whereby discrete metallic deposit patterns are electroless plated on non-magnetic substrates according to the above-described methods will be apparent to those skilled in the art. It will, therefore, be appreciated by those skilled in the art that a limitless variety of patterns may be plated according to the invention, being formed photographically upon an emulsion-coated, gelled substrate and thereafter electrolessly plated selectively.

FILAMENTARY TRACK RECORD

Having described the novel electroless plating process according to the invention, reference will now be had to the novel products thereof indicated in FIGS. 1–5 of the drawings. Thus, according to another aspect of the invention, a magnetic unit record may be formed, preferably as before described, to comprise a discrete track magnetic card for recording computer input/output binary data and the like. Such a card record R is indicated in FIG. 1, having a plurality of precisely positioned discrete recording tracks of prescribed width TT extending in parallel across card R, each track comprising one or more strips T of magnetizable material. Strips T are preferably electroless plated upon a non-metallic (preferably flexible, polymeric) base B. Strips T have a prescribed "anisotropy width" and are separated by non-magnetizable upstanding lands *e* preferably comprised of photo-emulsion material. In the manner of the process described above, strips T are formed as narrow filaments of magnetic metal (such as nickel, cobalt, iron phosphorous or alloys thereof) electroless plated upon an interface material IF coated on the respective surface of base B. Layer IF comprises the residue product resulting from coating base B with a water-permeable colloid (gel) and dipping it into solutions containing pre-plating conditioning material to adhere "seed" particles of nucleating metal, such as palladium or the like, in and upon the colloid, being uniformly dispersed across the surface thereof. Such particles efficiently initiate electroless plating of strips T in the grooves between emulsion lands e, as described in the aforementioned methods.

FIGS. 2A and 2B show, in plan view, an enlarged section of a record (like record R above) wherein illustrative track zones Z–1, Z–2, of width TT, each comprise a plurality of narrow filaments (S) spaced apart and parallel. Zones Z are analogous to strips T of FIG. 1, these zones, however, comprising a multi-filament plating. Zones Z are separated by non-magnetic emulsion lands *e* (e.g. $e_2$ between $Z_1$, $Z_2$), each zone comprising four narrow parallel filaments, *s–a* to *s–d*, separated by grooves *g* of like, minimal width, being kept as narrow as possible. Zones Z thus each define a discrete multi-filament track which will, of course, be understood to be operable with a respective read-write transducer TG intended to be centered thereabove as known in the art. For instance, transducer TG–2 is shown operatively centered over associated track zone Z–2, while companion transducer TG–1 shown somewhat off-centered with respect to corresponding zone Z–1. Zone Z–1 thus comprises four like, plated filaments S–1–*a* through S–1–*d*, separated, successively, by three like groove spaces *g*–1–*a* through *g*–1–*c*. As seen below gaps *g* are made as narrow as is practicable, approaching zero width, as long as the magnetic reluctance characteristic therebetween is high enough for effective isolation, etc.

The other recording zones on the record (e.g. Zone Z–2) will be understood as similarly constructed. Zones Z–1, Z–2, etc. are arranged to have a prescribed identical zone width dimension TT and to be separated by like non-magnetic zones *e*, preferably, of identical dimension GG. Gap width GG will often be at least sufficient to allow for the maximum wander (off centering or repositioning error) of the transducers consistent with effective, accurate readout. Zone width TT is preferably substantially less than track width, i.e. the width *w* of the reading gap across an associated transducer TG to accommodate such wander without degradation of readout. For instance, it is a feature of the invention that, where each zone comprises a multi-filament construction, width TT may be considerably less than that required for a continuous strip track of the same readout characteristics.

A somewhat alternate construction is indicated in FIG. 2C where a pair of "single filament" strips T′ are schematically shown in operative relation with associated transducers TG′, strips T′, having a prescribed width *m′* and being separated by non-magnetic zones of relatively large width GG′. In this case, track width *w* will be seen as very substantially larger than strip width *m′*. Transducers TG′ may thus wander laterally substantially from centering over their associated strip, for instance, as indicated by transducer locus W–SK, indicating a downward wander of transducer TG′–1 to occupy an extreme "off-centered" track location, while still being operatively associated with strip T′–1 however.

FIG. 3A indicates, in enlarged plan view, a few of the filaments *s–2* comprising zone Z–2 of FIG. 2, these filaments being aligned to be longitudinally parallel with prescribed associated read/write direction $A_x$ and having approximately the same width *m*. Filaments S–2 are separated by gaps *g–2* of width *gs* and extending to comprise, in effect, multi-filament tracks, or recording zones, of width TT. According to a feature of the invention, filament widths *m* may be prescribed to provide an aggregate width *nm* (*n* = *no.* filaments) of magnetic material sufficient to provide a prescribed surface area (of magnetic material) across read/write gap W. This area, in turn, will provide sufficient magnetization to yield a prescribed minimum readout voltage for each bit at a given bit-density (bit-density determining bit-length). For instance, TT may be about 10 mils ($n = 5$), *m* may be about 1.6 mils and gs about 0.5 mils for a record R having a bit-density of about 7,000 bits/in. and requiring a minimum output voltage of about 5 mv. (assuming plated film about 0.5 micron thick, $H_c$ about 450 Oe. and transport speed about 600 in/sec.).

As aforementioned, filaments *s–2* are of width *m* sufficiently small to induce magnetic shape anisotropy therein. Magnetization vectors $V_b$, $V_c$ in filaments *s–2–b*, *s–2–c*, respectively, illustrate than an extremely narrow width *m*, with respect to the long (effectively infinite) length of the filaments *s*, can induce alignment (of the magnetized domains comprising a recorded bit) relatively along the elongate axis of the filaments, i.e. along read/write axis $A_x$. Thus, there will be only relatively small magnetic field components transverse to axis $A_x$ (i.e. across the width of Zone Z–2) and relatively large components along axis $A_x$. This is indicated by the pairs of orthogonal dotted line vectors, indicated as resolving into respective "full-line" magnetization vectors $V_b$, $V_c$. These vectorially indicated magnetic moments are thus so resolved as to result in an effective net magnetic force extending almost parallel along axis $A_x$, as indicated.

FIG. 3B is an idealized illustration, much enlarged, of a portion of filament *s*–2–*b* in FIG. 3A, indicating what is believed to be a typical alignment of magnetic domains therein as a result of the aforementioned shape anisotropy effect. FIG. 3B vectorially indicates a number of like sized magnetic domains having a resultant net magnetization which is "preferentially longitudinal", i.e. having an "easy" switching axis aligned along axis $A_x$ and a "hard" axis transverse thereto, this net vectorial effect being induced by the narrow width of the filament. The indicated magnetic domains are, of course, of arbitrary size. For explanation purposes, it will be assumed that four lines of externally generated magnetic flux *a—a*, *b—b*, *c—c*, *d—d* are shunted therethrough, each exhibiting the indicated different directionality (arrows). The direction of the arrows in each domain thus indicates what is believed to be the likely magnetization direction of the domain in response to this externally applied flux. The domains may be identified in grid fashion with reference to rows A, B, C, D, E and columns I, II, III, IV and V. Thus, it will be seen that neither the longitudinally central domains (i.e. those along column III), nor the laterally central domains (i.e. those along row C) are significantly affected (misaligned or skewed) by the externally applied flux, remaining aligned relatively parallel with axis $A_x$. Domains adjacent (surrounding) these central domains are somewhat, but not greatly, affected by this external flux, being slightly misaligned with axis $A_x$. That is, the domains along rows B and D (surrounding row C) are only moderately misaligned with axis $A_x$, as are the domains in columns II and IV (surrounding column III). As one proceeds farther outboard of these central domains, however, misalignment with axis $A_x$ becomes more marked, the farther outboard domains being more influenced by fringing fields. This is exemplified by "outlying" domains I–A, I–E in column I and V–A, V–E in column V. Moreover, it will be apparent that similarly oriented external magnetic flux may be expected to occur randomly along axis $A_x$. This means, of course, that the "outboard" domains along a strip, i.e. those along rows A, E, for instance, may expect to be subject to such fringing, misaligning flux.

The narrow anisotropy width filaments of the invention alleviate another very serious skew-inducing problem long known in the art, namely lateral self-demagnetization. Self-demagnetization, as here understood, constitutes an internal domain misalignment (e.g. as indicated along closed (return) internal magnetization vector loops $L_p$ in FIG. 3B) resulting from a prior prescribed net magnetization (e.g. along $A_x$ as established relatively along the "central" domains). Once established, such magnetization can induce opposing magnetization patterns along loops $L_p$ (e.g. when the Write-Head is removed) tending to oppose the original "properly aligned" domains and seeking to "return" the flux within the medium, thus opposing domain alignment along $A_x$ and causing skew. In practice, this means that if a "Write Field" defined along flux lines *a—a*, *b—b*, *c—c*, *d—d*, had established the indicated magnetization (all the domains in FIG. 3B constituting a single magnetic record "bit") and was then removed, self-demagnetizing forces would be set up in the outboard domains (i.e. along loops $L_p$ if there were strip material there, strip *s*–2– *b* being relatively wider than illustrated) which would oppose the recorded magnetization bit, thus degrading, and possibly nullifying, the readout signal therefrom. This lateral self-demagnetizing phenomenon is most pronounced with "soft" (low $H_c$) flat, thin films, which thus suffer relatively severe domain skew therefrom as opposed to the "hard" (high $H_c$) films. Use of very narrow filamentary strips according to the invention thus advantageously reduces such self-demagnetization.

Additionally, "soft" magnetic films are especially limited in bit-density by the above-described lateral self-demagnetization. Lateral demagnetization will be understood as opposed to vertical, or "thickness"-, self-demagnetization normal to the record plane. That is, the skew produced by such demagnetizing forces is more serious for soft films, since the demagnetizing constant (D) appears to vary inversely with $H_c$ and directly with bit-density, given the same strip width. Thus, soft magnetic films are especially apt for employing such narrow, width anisotropy filaments according to the invention, especially at higher bit-densities. Of course, some advantage may also be derived using the invention with relatively hard films (e.g. 200–300 Oe.) at even a wider strip width, since they are less sensitive to these demagnetizing forces.

Thus, according to the invention, it is preferred to reduce the width *m* of such discrete filaments to approach the width of a single magnetic domain, whereby there will be no (or at least few) laterally surrounding (outboard) domains to be radically misaligned therewith and to degrade the resultant force of magnetization along the prescribed record axis. Stated otherwise, such a minimum-width filament cuts a minimum of diverging, misaligned flux lines. Furthermore, such filamentary strips are even more advantageous when grouped together to comprise a single record track, the grouped filaments being separated only by a minimal gap of higher, isolating reluctance.

FIG. 4 indicates, in exemplary cross section, the discrete track record embodiment R of FIG. 1, electroless plated according to the foregoing novel methods taught by the invention. The illustrated record comprises a base B, of Mylar, or the like, about 4 to 7 mils thick, magnetic recording strips T (separated by lands *e*) and an interface layer IF. Layer IF includes nucleating sites, (e.g. palladium particles described above), adhered uniformly over the surface of substrate B, being lodged in the residue from the water-permeable colloid (gel) coating thereon. It will be understood that a layer of photosensitive emulsion material including conventional silver halides will have been provided continuously across the surface of the aforementioned colloid layer as detailed in the foregoing process. This emulsion, together with the original gel layer, may typically total about 200 $\mu$-in. The emulsion will then have been selectively etched in the positive plating areas to define the track pattern, the undeveloped silver halide material being removed so that electroless plating may take place there to form discrete track strips T between non-magnetic developed-emulsion land areas *e*, as shown in FIG. 1.

A related discrete track magnetic record is indicated sectionally in FIG. 5, being similar to that shown in FIG. 4, but including added superposed layers of magnetic strip material. Base B, interface layer IF and emulsion lands *e* will be understood as similar to the analogous elements in FIG. 4, while track strips T′ are indicated as comprising plural superposed layers $M_1$, $M_2$ of like magnetic metal, separated by a non-magnetic layer $C_u$ of prescribed thickness. Magnetic layers $M_1$, $M_2$ will have substantially the same magnetic properties and the same thickness (e.g. about 20 micron-inches). Non-magnetic layer $C_u$ may comprise copper, or some other non-magnetizable (low-permeability) material, having a thickness, (e.g. about 10 micro-inches) greater than that which would "magnetically couple" magnetic layers $M_1$, $M_2$ as this is generally understood in the art. Thus, it is intended that prescribed magnetic bit signals are intended to be recorded as vertically registering duplicates, along duplicate track layers $M_1$, $M_2$ so that these may reinforce one another to provide a stronger, composite readout signal. Of course, for further reinforcement, additional magnetic layers may be used, being separated by the same kind of non-magnetic, non-coupling intermediary layer. It will be recognized that this arrangement is quite distinct from "magnetically coupled" films where the magnetic layers have very different magnetic properties and must be separated no more than a prescribed "coupling-distance".

Workers in the art will appreciate that the foregoing plating methods may be modified as to deposited magnetic materials, substrate, plating steps, and the like to equivalently achieve the results derived by, the invention as described and claimed. Likewise, the above-described filamentary magnetic records may be modified as to substrate, magnetic metals, number and arrangement of filaments, fabrication methods and the like, without departing from the scope of the claimed invention.

Other applications for the invention will be evident from the above description and the invention should not be considered as confined to the exemplary embodiment described. While the invention has been particularly shown and described with reference to the preferred embodiment thereof, it will be understood by those skilled in the art that various changes in form and details in constituent and steps in concentrations and in ranges may be made without departing from the spirit and scope of the claimed invention.

What is claimed is:

1. A magnetic record having a non-magnetic substrate carrying information-storing magnetic material arranged in discrete, elongated tracks, and characterized by the improvement wherein each said track includes plural strips of said magnetic material separated from each other by relatively non-magnetic material having a width substantially narrower than the spacing between adjacent tracks, and each said strip has a width, transverse to the elongation of said tracks, such that said magnetic material has a magnetic shape anisotropy with the axis of easy magnetization oriented substantially along the elongation of said tracks.

2. A record as defined in claim 1 in which each said strip comprises at least two layers of said magnetic recording material separated by a layer of non-magnetic material and wherein said layers of each strip are substantially in register with each other.

3. A magnetic record as defined in claim 1 further comprising a non-magnetic material disposed intermediate said strips and said tracks and having a thickness sufficient to form lands upstanding on said record further than said recording material.

4. A magnetic record having a nonmagnetic substrate carrying information-storing tracks of magnetic material with the tracks arranged according to first pattern, and characterized by the improvement wherein A. gelatinous material coats said substrate intermediate said substrate and said recording material, B. particulate silver metal is secured on said gelatinous material in accordance with said first pattern, C. each said recording track includes at least one strip of said information-storing material, said strip having a width sufficiently narrow so that said magnetic recording material has a magnetic shape anisotropy with a preferred direction of magnetization transverse to said strip width and directed along said strip, and D. relatively nonmagnetic material separates said strips from each other in the direction of said strip width.

5. A magnetic record as defined in claim 4 in which each said recording track 1. is elongated in the direction transverse to the strip width and is spaced a first distance from adjacent tracks, and 2. includes plural strips separated from each other by a second dimension markedly less that said first dimension.

6. A magnetic record having a nonmagnetic substrate carrying information-storing tracks of magnetic recording material, and characterized by the improvement wherein A. said tracks are arranged in a first pattern in which they extend in the same direction on said record and are spaced from one another transverse to said direction of extension, B. gelatinous material coats said substrate substantially continuously intermediate said substrate and said recording material, C. metallic plating-nuclei particles are seeded onto said gelatinous material in said first pattern only, D. said recording material overlies said seeded gelatinous material, to be contiguous therewith in said first pattern only, and E. the spaces between said tracks of recording material are devoid of magnetic material.

7. A magnetic record as defined in claim 6 in which said first pattern is so configured that each said recording track consists of plural separate, spaced-apart strips extending in the same direction as said track and the spaces between said strips are devoid of magnetic material and are considerably narrower than the spaces between said tracks.

8. A magnetic record as defined in claim 6 in which said recording material is arranged in at least two separate, spaced-apart and in-register layers in each said track and further comprising a layer of nonmagnetic material between said two layers of magnetic recording material, with said layer of nonmagnetic material having sufficient thickness to preclude significant magnetic coupling between said two layers of recording material.

9. A magnetic record as defined in claim 6 further comprising lands of developed photographic material intermediate adjacent recording tracks and protruding from said substrate to above said magnetic material of said recording tracks, so that said tracks are recessed below said lands.

10. A method of making a magnetic record having tracks of information storing magnetic material on a nonmagnetic substrate, said method comprising the successive steps of A. providing a multi-layer nonmagnetic substrate having a nonmagnetic base layer, a layer of gelatinous material covering said base layer, and a layer of photosensitive photographic material covering said gelatinous layer, B. photographically exposing and developing said photographic material on said substrate selectively to remove said photographic material, and thereby expose said gelatinous material, in only a first surface pattern that defines said tracks extending along said record and spaced from each other by nonmagnetic material, and to provide developed photosensitive material on the rest of the surface of said substrate, and C. electrolessly plating said information-storing material on only said exposed gelatinous material of said substrate, thereby to provide said tracks with said magnetic material in only said first pattern.

11. The method defined in claim 10 in which said plating step includes a preliminary step of sensitizing said exposed gelatinous material in said first pattern with metallic plating-nuclei particles and thereafter subjecting said sensitized substrate to an electrolyte for electrolessly depositing said magnetic material.

12. The method defined in claim 10 in which said exposing and developing steps leave on said substrate upstanding lands of developed photosensitive material intermediate said tracks.

13. The method defined in claim 10 in which said exposing and developing steps remove said photographic material in accordance with a first pattern that forms said tracks extending in the same direction along said record and spaced-apart transverse to said direction of extension and further forms each said tracks with plural narrow strips closely spaced apart to be separate from other strips of the same track.

14. The method defined in claim 13 in which said exposing and developing steps are further characterized as removing said photographic material in accordance with a first pattern that defines each said strip to have a width sufficiently narrow so that said magnetic recording material deposited therein has a magnetic shape anisotropy with a preferred direction of magnetization longitudinal to said strip, and in which said plating step provides said magnetic recording material only in said track-forming strips.

* * * * *